United States Patent [19]
Tateno

[11] 3,949,188
[45] Apr. 6, 1976

[54] METHOD AND APPARATUS FOR OPERATING AN ARC-TRANSFER TYPE TORCH

[75] Inventor: Haruo Tateno, Kiyose, Japan

[73] Assignee: Rikagaku Kenkyusho, Japan

[22] Filed: July 16, 1974

[21] Appl. No.: 488,943

[30] Foreign Application Priority Data
July 20, 1973  Japan................................ 48-82357

[52] U.S. Cl. .......................................... 219/121 P
[51] Int. Cl.² ........................................ B23K 5/00
[58] Field of Search .................... 219/121 P, 74, 75; 313/231

[56] References Cited
UNITED STATES PATENTS

| | | | |
|---|---|---|---|
| 2,935,312 | 5/1960 | Kilpatrick et al. | 219/75 X |
| 3,602,683 | 8/1971 | Hishida et al. | 219/121 P |
| 3,604,889 | 9/1971 | Rohrberg | 219/121 P |
| 3,612,807 | 10/1971 | Liekens et al. | 219/121 P |
| 3,627,965 | 12/1971 | Zweig | 219/121 P X |
| 3,692,973 | 9/1972 | Oku et al. | 219/75 X |
| 3,770,935 | 11/1973 | Tateno et al. | 219/121 P |

*Primary Examiner*—Elliot A. Goldberg
*Assistant Examiner*—G. R. Peterson
*Attorney, Agent, or Firm*—Bucknam and Archer

[57] ABSTRACT

Disclosed is an improved method and apparatus for operating an arc-transfer type torch having a cathode rod and two coaxial annular bodies. According to this invention an inactive gas is supplied to the annular space between the cathode rod and the inner annular body, at a very small flow rate, and an active gas such as oxygen is supplied to the annular space between the inner and exterior annular bodies at a relatively large flow rate. The plasma is composed of an active gas of high concentration heated by a transfer arc.

In the method of this invention dross-less cutting is performed. Also an arc current can be increased without deforming the cathode rod of the torch, and therefore the cutting speed can be increased by raising the arc current.

5 Claims, 10 Drawing Figures

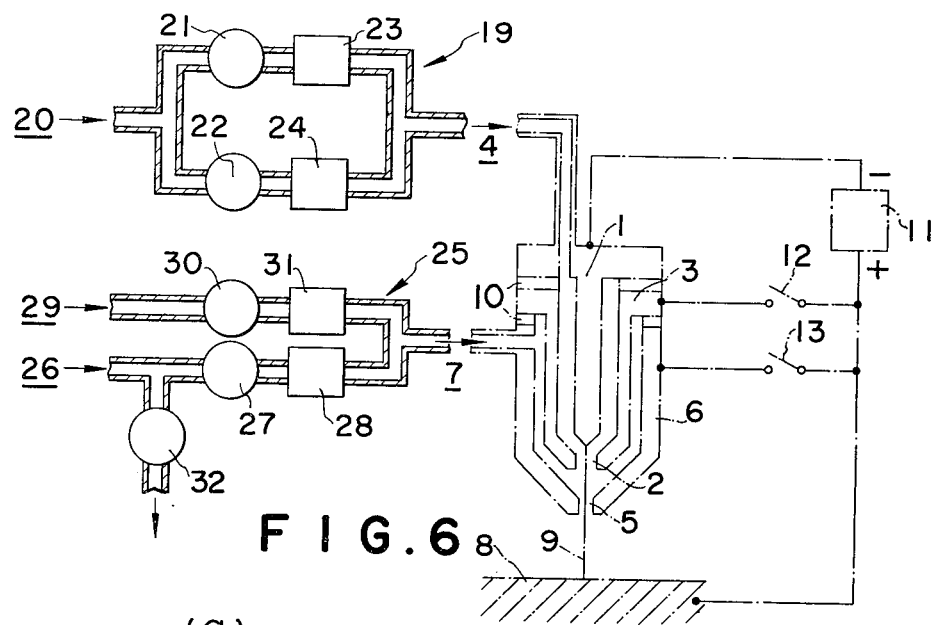
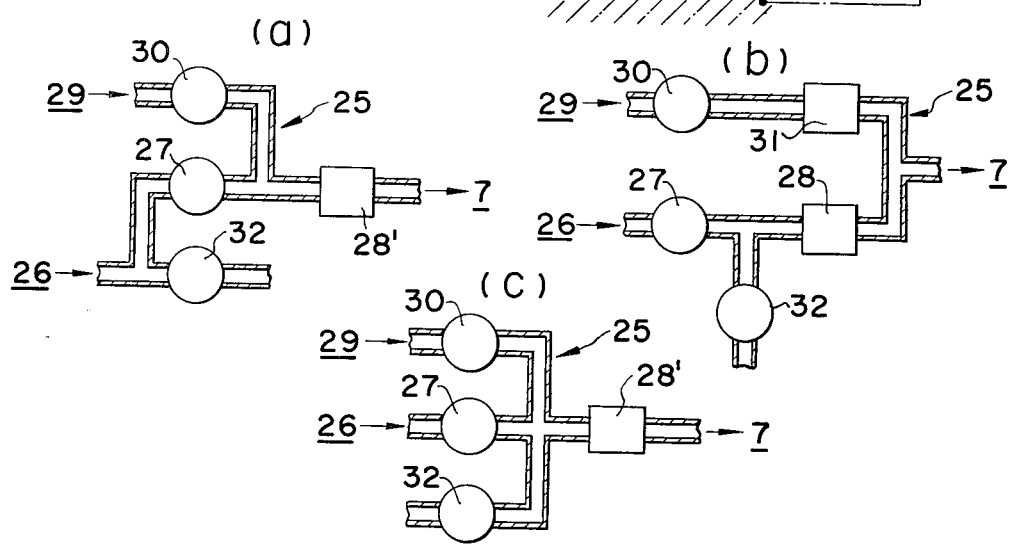
FIG.6
FIG.7
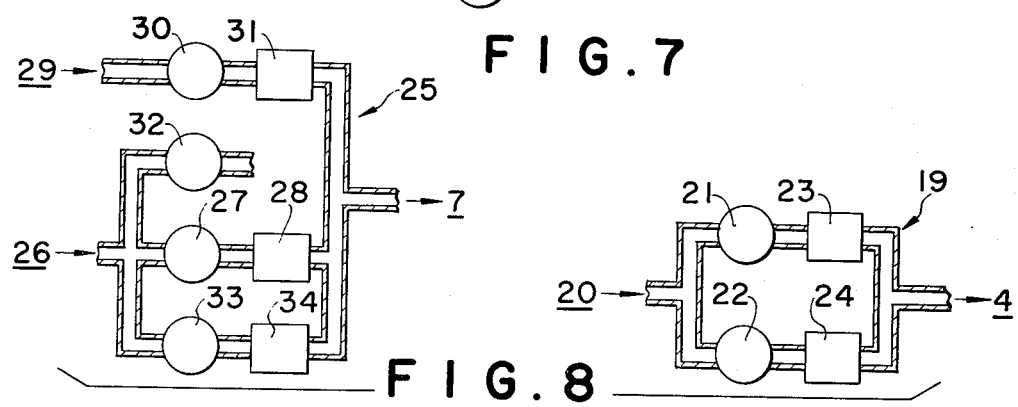
FIG.8

METHOD AND APPARATUS FOR OPERATING AN ARC-TRANSFER TYPE TORCH

This invention relates to a method and an apparatus of operating an arc-transfer type torch having a cathode rod and two surrounding annular bodies by using oxygen, air and other gasses which will chemically erode the cathode rod.

In cutting a piece of iron, aluminum and other metals by an arc-transfer type torch it is well known that the use of air or oxygen as an operating gas (plasma gas) improves the appearance of the cut end of the metal piece and that such use of active gas raises the cutting speed of the torch. Hitherto two different methods have been proposed, and actually used. One of these methods (hereinafter referred to as the "first method") uses an arc torch having a cathode rod made of zirconium or an alloy thereof and a single coaxial annular body, and in operation air is supplied in the annular space between the cathode rod and the annular body. The arc torch of this type works well. Disadvantageously however the cathode rod of the torch is eroded in such a relatively short time that the maintainance cost is as large as one half of the total working cost.

The other method (hereinafter referred to as the "second method") uses an arc torch having a cathode rod and two coaxial annular bodies, and in operation an inactive gas is supplied in the annular space between the cathode rod and the first annular body, and at the same time an active gas is supplied in the annular space between the first annular body and the second annular body, thus protecting the cathode rod from the active gas. This second method has been proposed and actually used since an arc-transfer type torch was invented. The basic idea of the same is disclosed in U.S. Pat. No. 2,890,322. The sharpness in focussing or concentration of energy on a piece of metal which is being cut is less than that found in the "first method".

The "second method" of operating a torch having a cathode rod and two coaxial annular bodies comprises the steps of: supplying an inactive gas in the annular space between the cathode rod and the first annular body establishing an arc between the cathode rod and a piece of metal to be cut; and supplying an active gas in the annular space between the first and second annular bodies; thus establishing a plasma composed of the active gas which is heated at a high temperature. It has been generally admitted that if the flow rate of an inactive gas used is lowered, the cathode rod will be eroded and deformed and that even if the flow rate of an active gas used is raised, the cutting speed of the torch will not rise. In this connection no attempt has been made to find how the concentration of energy varies with the flow rate of a protecting gas.

The inventor discovered that the heat loss at the nozzle aperture of the second annular body decreases if the flow rate of the inactive gas is decreased below a certain critical value, the value being very small compared with the flow rate of the inactive gas which has been hitherto deemed as appropriate. Also, the inventor discovered that the flow rate of the inactive gas which is required for protection of the cathode rod can be very small if the flow rate of the active gas is kept at a constant value.

This invention is based on these discoveries.

One object of this invention is to provide a method of operating an arc-transfer type torch at an increased concentration of energy without shortening the life of the torch.

Another object is to provide an arc-transfer type torch apparatus which is directly used in performing the above operating method.

Other objects and advantages of this invention will be understood from the following description which is made with reference to the accompanying drawings:

FIG. 6 shows first and second gas-supply channels to be connected to the arc torch of FIG. 1;

FIGS. 7a, 7b and 7c show different modifications of the second gas-supply channel; and FIG. 8 shows a modification of the gas-supply channel of FIG. 6.

Figure 1:
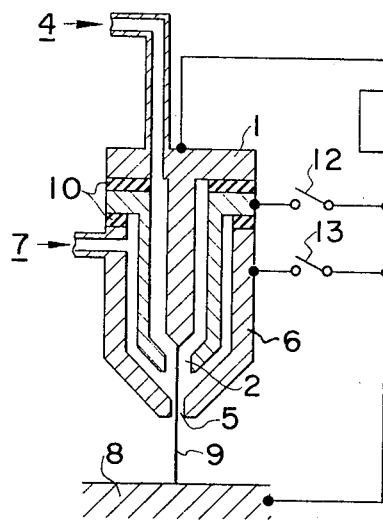
FIG. 1 shows, in section, a conventional arc-transfer type torch having a cathode rod and two annular bodies.

Referring to FIG. 1, there is shown an arc-transfer type torch to which this invention is applied. In operation an inactive gas 4 is supplied to the first channel between the cathode rod 1 and the first annular body 3 whereas an inactive gas 7 is supplied to the second channel between the first annular body 3 and the second annular body 6. A transfer type arc 9 is established across the space between the cathode rod 1 and an object 8 which is subjected to working. 2 and 5 are the nozzle apertures of the first and second annular bodies respectively. 10 is an electric insulator, and 11 is a DC supply which has a drooping voltage-to-current characteristic. The cathode rod 1 is connected to the negative terminal of the DC power supply 11. The first and second annular bodies 3 and 6 are connected through switches 12 and 13 to the positive terminal of the power supply 11. The workpiece 8 is connected to the positive terminal of the power supply 11. The first and second annular bodies have water-cooling means (not shown).

The torch is put in operation after a sequence of following steps:

Step 1

An inactive gas 4 is supplied to the first channel at a flow rate enough to allow the arc foot to move from the nozzle of the first annular body 3 to the nozzle of the second annular body 6.

Step 2

The power supply 11 is put in operation, an AC electric energy of high frequency being superposed onto a DC energy. The switches 12 and 13 are closed, and then an arc is established across the space between the cathode rod 1 and the nozzle of the first annular body 3.

Step 3

The switch 12 is opened, thus causing the arc foot to move from the nozzle of the first annular body 3 to the nozzle of the second annular body 6.

Step 4

The switch 13 is opened, thus causing the arc foot to move from the nozzle of the second annular body 6 to the workpiece 8.

Step 5

The supply of an active gas 7 to the second channel starts, and the flow rate of the active gas gradually increases.

In the course of starting operation the value of the electric current and the flow rate of the inactive gas are carefully controlled with a view to avoiding occurrence of a double arc.

This invention is an improvement of the operation of the torch of the type above specified, and the central feature of this invention is that: the flow rate of the inactive gas 4 is above the minimum flow rate which is still enough to prevent the active gas from invading in the first channel, and the flow rate of the inactive gas is within the range in which first, the wall potential of the second annular body 6 decreases with the increase of flow rate of the inactive gas and second, the heat loss at the second annular body increases with the increase of flow rate of the inactive gas.

Figure 2:
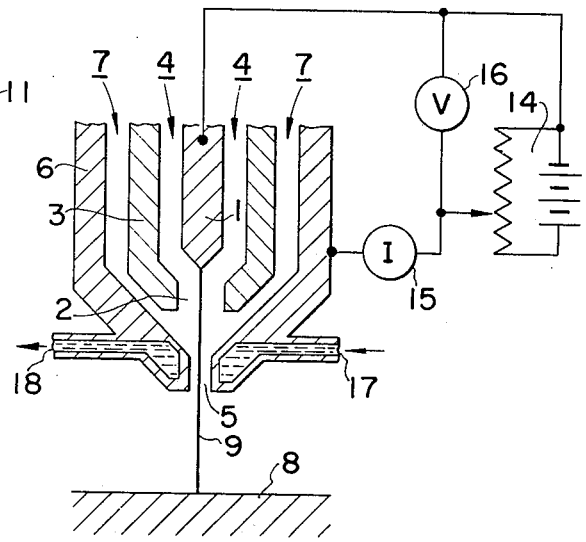
FIG. 2 shows an electric circuit by which the parameters of the method of this invention can be determined.

Referring to FIG. 2, there is shown an electric circuit by which the parameters of the method of this invention is determined. A potentiometer 14 is connected to the second annular body 6 via an ammeter 15, and when the ammeter reads zero at a proper position of contact, the potential difference between the cathode rod and the second annular body is determined from a voltmeter 16. This is a wall potential Vca (volts) at the second annular body.

Cooling water is supplied from the inlet 17 of the second annular body at a flow rate L (1/min), and is discharged from the outlet 18. The temperature $T_1$ (°C) of the water at the inlet is determined, and the temperature $T_2$ (°C) of the water at the outlet is measured. The heat loss W (watts) at the second annular body is given from the following equations:

$$W(\text{watts}) = \frac{L \times 1000}{60} \times 4.2 \times (T_2 - T_1)$$

$$= L \times (T_2 - T_1) \times 70$$

Figure 3:
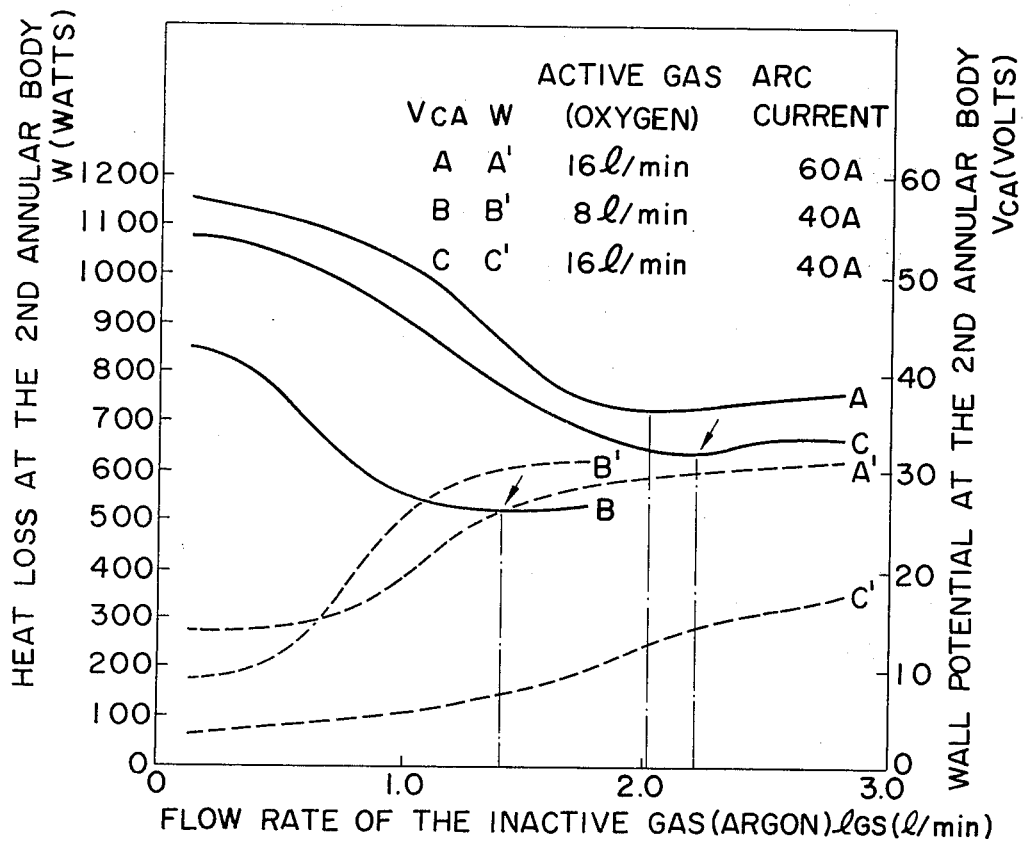
FIG. 3 is a graphic representation in which the heat loss and the wall potential at the second annular body were plotted against the flow rate of an inactive gas (argon)

FIG. 3 shows the results of measuring the flow rate $IGS$ (1/min) of the inactive gas in the first channel with regard to the wall potential $V_{CA}$ and the heat loss W at the second annular body of the torch (the nozzle aperture 2 of the first annular body being 3 mm in diameter, and the nozzle aperture 5 of the second annular body 1.5 mm in diameter).

As is apparent from this result, if the flow rate $IGS$ of the inactive gas 4 is decreased, the wall potential $V_{CA}$ (solid lines) at the second annular body rises after passing the valley point (indicated by arrow). Contrary to this, the heat loss W (broken lines) lowers sharply if the flow rate of the inactive gas is decreased below the one at which the wall potential $V_{CA}$ is at the minimum. From the aspect of change of the wall potential and the heat loss at the second annular body it appears to the inventor that: (1) if the flow rate $IGS$ of the inactive gas is above the one at which the wall potential is at the minimum, the upstream part of arc column composed of the inactive gas extends from the cathode rod to the nozzle aperture 5 of the second annular body and the remaining (or downstream) part of an arc column composed of the active-and-inactive gas mixture extends from the nozzle aperture 5 of the second annular body to the workpiece 8, and (2) if the flow rate $IGS$ of the inactive gas decreases below the above crytical point, the upstream part of arc column shortens away from the nozzle aperture 5 of the second annular body, allowing the downstream part of arc column composed of the active-and-inactive gas mixture to lengthen as much as the upstream part shortens.

If the flow rate $IGS$ of the inactive gas 4 is controlled to cause the downstream part of active-and-inactive gas mixture to appear in the longitudinal space between the first annular body and the second annular body, the active gas stream surrounding the upstream part of the arc column and heated thereby to the state of being "plasma" is advantageously used in cutting a workpiece of soft steel or aluminium. The plasma gas oxidizes well the cutting part of the workpiece. Thus, the metal is completely removed from the workpiece, leaving little or no dross on the cutting edge. Still advantageously, the cutting speed rises. The active-and-inactive gas mixture used in the torch according to this invention has the ratio of the inactive to active gas flow rate ranging from 10:90 to 1:99. Apparently, thank to the use of such a high-concentrated active gas the dross-less cutting is performed.

Figure 4:
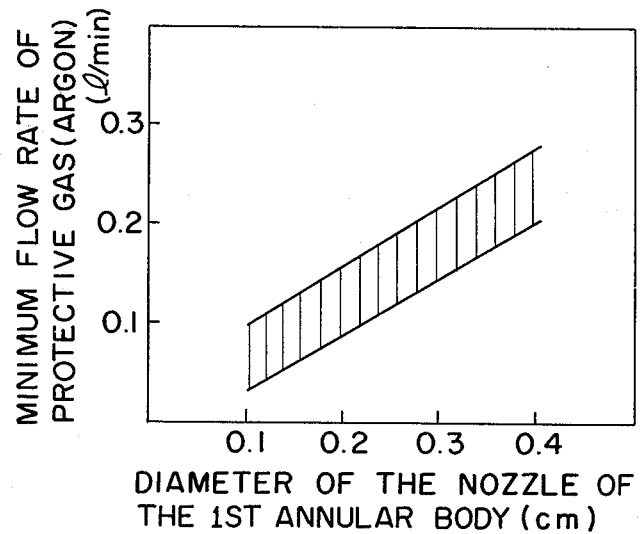
FIG. 4 is a graphic representation in which the minimum flow rate of the protective gas was plotted against different nozzle diameters of the first annular body.

It is very difficult to determine the wall potential $V_{CA}$ and the heat loss W at the possible minimum flow rate of the inactive gas 4 (at the left ends of the solid and broken curves in FIG. 3). In reducing the flow rate of the inactive gas 4 the wall potential $V_{CA}$ and the heat loss follow the curves as shown in FIG. 3, and if the flow rate of the inactive gas 4 decreases beyond a certain critical minimum, the active gas will invade in the first annular body, thus subjecting the cathode rod to a vigorous oxidization. The minimum flow rate of the inactive gas 4 which is still enough to prevent the invasion of the active gas into the first annular body, depends on the diameter of the nozzle aperture of the first annular body rather than the gas pressure or the electric current value in the torch. FIG. 4 shows the relation between the minimum flow rate (1/min.) of the protective gas and the diameter (cm) of the nozzle aperture of the first annular body.

According to this invention the torch is operated at a flow rate of the inactive gas properly selected in the range in which the sign of $dV_{CA}/dI_{GS}$ remains negative and the sign of $dW/dI_{GS}$ positive.

Figure 5:
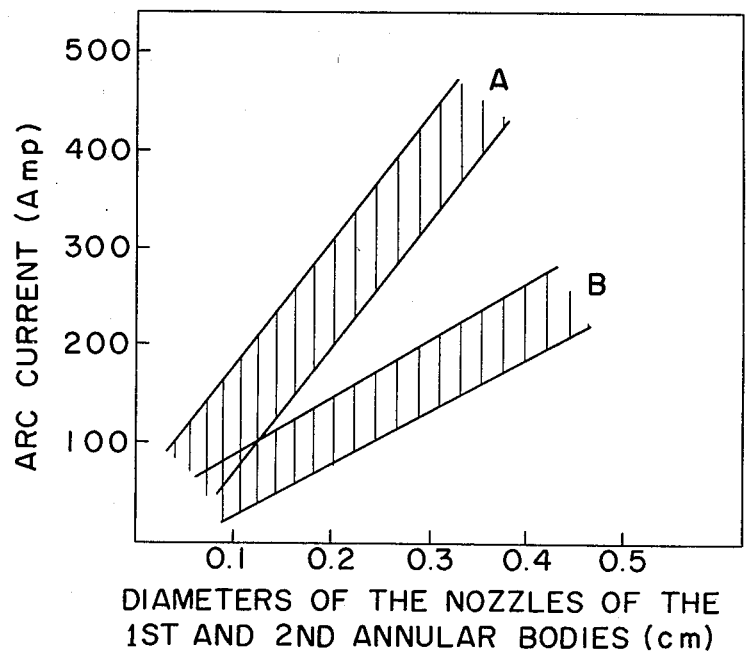
FIG. 5 is a graphic representation in which the arc current was plotted against different nozzle diameters of the two annular bodies of an arc torch of the type which is shown in FIG. 1.

In FIG. 5, "A" is the proper area in which the arc current is to be selected with reference to the diameter of the nozzle aperture 5 of the second annular body when the arc torch is operated according to the principle of this invention. (Also, A corresponds to the area in which the arc current is to be selected with reference to the diameter of the nozzle of the single annular body of the torch when operated according to the "first method" as mentioned earlier as a prior art). Likewise, "B" is the area in which the arc current is to be selected in connection with the diameter of the nozzle aperture 2 of the first annular body when the torch is operated according to this invention.

When a plate of soft steel as thick as 10 mm was cut with an arc torch operated according to this invention, the cutting end showed a pleasant appearance without any dross. The factors of operation were as follows:

| | |
|---|---|
| diameter of the nozzle aperture of the first annular body | : 3 mm |
| diameter of the nozzle aperture of the second annular body | : 1.5 mm |
| inactive gas in the first gas channel | : 0.2 l/min(argon) |
| active gas in the second gas channel | : 28 l/min(oxygen) |
| arc current | : 150 A |
| arc voltage | : 180 V |
| cutting speed | : 3.5 m/min |

The arc torch was operated for 100 and more hours, and it was found that the torch was in a good state, requiring no repairs.

When the flow rate of the inactive gas 4 was raised to 0.8 *l*/min with the other factors unchanged, a double arc often appeared in the nozzle aperture 5 of the second annular body.

As seen from the area A in FIG. 5, the energy is concentrated at the nozzle aperture of the second annular body as well as the energy would be concentrated if the torch were operated according to the first method as mentioned earlier as a prior art.

Careful control of the gas supply system is required in operating a double-shelled arc torch according to this invention. The inactive gas is supplied at a small flow rate, and the pressure of the inactive gas at the nozzle 2 of the first annular body is as low as about 10 mm $H_2O$. In this connection a time wasting and laborious control is required in supplying an active gas to the second channel. Because otherwise, a transient disturbance at the nozzle 2 of the first annular body would be inevitable.

According to this invention there is provided a gas supply system which permits the torch to start operation according to the method of this invention in a relatively short time without disturbance at the nozzle 2 of the first annular body.

Referring to FIG. 6 there is shown a gas supply system to be connected to the torch as shown in FIG. 1. The first gas supply channel 19 to be connected to the first channel of the torch has electromagnet valves 21 and 22 to control the supply of gas 20 from an inactive gas source (not shown) and needle valves 23 and 24 to control the flow rate of the gas 20. The second gas supply channel 25 to be connected to the second channel of the torch has an electromagnet valve 27 and a needle valve 28 both to control the supply of gas 26 from an active gas source (not shown), and an electromagnet valve 30 and a needle valve 31 both to control the supply of gas 29 from an inactive gas source (not shown). A branch channel upstream to the valve 27 has an electromagnet valve 32 to release the active gas from the second channel of the torch into the atmosphere.

The operation of the gas supply system is as follows:

1. The electromagnet valves 27 and 30 are closed to stop active gas 26 and inactive gas 29 whereas the electromagnet valves 21 and 22 are opened to supply inactive gas 20 to the first channel of the torch.

2. The switches 12 and 13 are closed, and the power supply 11 is put in operation so that a DC voltage and an AC voltage of high frequency are applied to the torch. Thus, an arc is established across the space between the cathode rod 1 and the nozzle 2 of the first annular body 3.

3. The switch 12 is opened, thus shifting the arc foot from the nozzle 2 to the nozzle 5 of the second annular body 6.

4. The electromagnet valve 30 is opened to supply the inactive gas 29 to the second gas channel of the torch. The electromagnet valve 22 is closed, and the needle valve 23 is controlled to reduce the flow rate of the inactive gas in the first channel to the minimum. The needle valve 31 is controlled so that the inactive gas pressure in the second channel may be equal to the active gas pressure at the running time of the torch.

5. The switch 13 is opened to establish an arc 9 extending from the cathode rod 1 to the workpiece 8. At the same time the electromagnet valve 30 is closed, and the electromagnet valves 27 and 32 are opened to replace the inactive gas by the active gas in the second channel. Finally, the electromagnet valve 32 is closed. (It should be noted that as a preliminary step to operation the needle valve 28 is adjusted to allow the active gas to flow at such a rate as is in working.)

At Step 4 the inactive gas is supplied in the second channel. At Step 5 after an arc is established across the space between the cathode rod and the workpiece, the inactive gas 29 is replaced by the active gas 26 at the same pressure, thus causing little or no disturbance in the second annular body 6, and the invasion of the active gas in the first channel is prevented at the time of substitution of the inactive gas for the active gas.

As for the electromagnet valve 32, when an active gas at an elevated pressure is supplied from the active gas source (not shown) to the second channel of the torch via the valves 27 and 28, the valve 32 functions as a relief valve, thus preventing the active gas at an elevated pressure from being directly applied to the second channel of the torch.

FIGS. 7*a*, 7*b* and 7*c* show different modifications of the second gas supply channel of the system. These modifications function in a similar way to the second gas supply channel of the system of FIG. 6. The channel of FIG. 7*a* has a single needle valve 28'. The channel of FIG. 7*b* has an open-to-atmosphere branch extending from the part between the electromagnet valve 27 and the needle valve 28, the branch having an electromagnet valve 32. The channel of FIG. 7*c* has a single needle valve 28' and an open-to-atmosphere branch extending from the part between an electromagnet valve 27 and a needle valve 28', the branch having an electromagnet valve 32.

FIG. 8 shows a modification of the gas supply system, which facilitates the control of the flow rate of the active gas 7 at the time of working. The second channel of this modification is different from that of the gas supply system of FIG. 6 in that a parallel channel having an electromagnet valve 33 and a needle valve 34 is connected and that the electromagnet valve 33 is actuated in a synchronous relation with the electromagnet valve 20 of the first gas supply channel. In working, the electromagnet valve 21 is opened and the electromagnet valve 22 is closed. The electromagnet valve 27 is opened and the electromagnet valves 32 anad 33 are closed. In the hope of increasing the flow rate of the active gas 26 during working, the electromagnet valve 33 is opened, thus allowing the active gas to flush in the second channel. The electromagnet valve 22 is opened synchronous with the actuation of the electromagnet valve 33. Thus, the flow rate of the inactive gas 4 rises in the first channel of the torch, preventing the active gas at an increased flow rate from invading in the first channel of the torch. Immediately after the flow rate of the inactive gas rises, the electromagnet valve 22 is closed. In short, the rise of the gas pressure in the first channel which is caused as a result of the sudden rise of the active gas pressure in the second channel, is suppressed by the sudden rise of the inactive gas pressure in the first channel. The closure of the electromagnet valve 33 suffices in reducing the flow rate of the active gas 7.

As is apparent from the above, in the method according to this invention an active gas of high concentration such as oxygen can be used as a working gas without damaging the cathode rod of the torch and the life of the cathode rod is as long as that would be if an inactive gas were used as a working gas. In this connection the total working cost is reduced to the half of the total working cost in the first method described earlier as the prior art. Still advantageously, the sharp focussing or good concentration of energy is obtained.

In the first method if an arc current is increased in an attempt to raise the cutting speed, the cathode rod is eroded and badly deformed in a short time. Therefore, the rise of cutting speed cannot pay for the erosion of the cathode rod. In contrast to this, in the method of this invention, if an arc current is increased, little erosion or deformation is found in the cathode rod, and therefore the cutting cost can be substantially reduced by raising the arc current.

What is claimed is:

1. In the method of operating an arc-transfer type torch having a cathode rod and first and second coaxially spaced annular bodies, the space between the cathode rod and the first annular body defining a first gas flow channel and the space between the first and second annular bodies defining a second gas flow channel, in which a flow of an inactive gas is supplied to the first channel, a flow of an inactive gas is supplied to the second channel and there is established an arc between the cathode and first annular body, the anode foot of which arc is subsequently transferred to the second annular body and thence to a workpiece; the improvement which comprises the steps of reducing the flow rate of the inactive gas in said first channel to a predetermined value above the minimum required to prevent invasion of gas into the first channel and within a flow rate range which, if the flow rate of inactive gas is increased, the wall electrode potential at said second annular body decreases and the heat loss at said second annular body increases; replacing the flow of inactive gas in said second channel with a flow of an active gas; and increasing the arc current to a predetermined value.

2. The improvement according to claim 1 wherein the flow rate of the inactive gas in the first channel is reduced to a value still sufficient to prevent active gas from said second channel from invading said first channel.

3. The improvement according to claim 1 wherein the flow of inactive gas in the first channel is reduced before the anode foot of the arc is transferred from said second annular body to said workpiece.

4. The improvement according to claim 1 wherein the step of replacing the flow of inactive gas in said second channel with a flow of an active gas is performed before the step of reducing the flow of inactive gas in the first channel.

5. The improvement according to claim 1 wherein said active gas is a gas selected from the group consisting of air and oxygen, and said inactive gas is argon.

* * * * *